Jan. 21, 1958   B. M. LARSEN   2,820,706
FURNACE AND METHOD FOR MAKING STEEL
Filed July 26, 1955
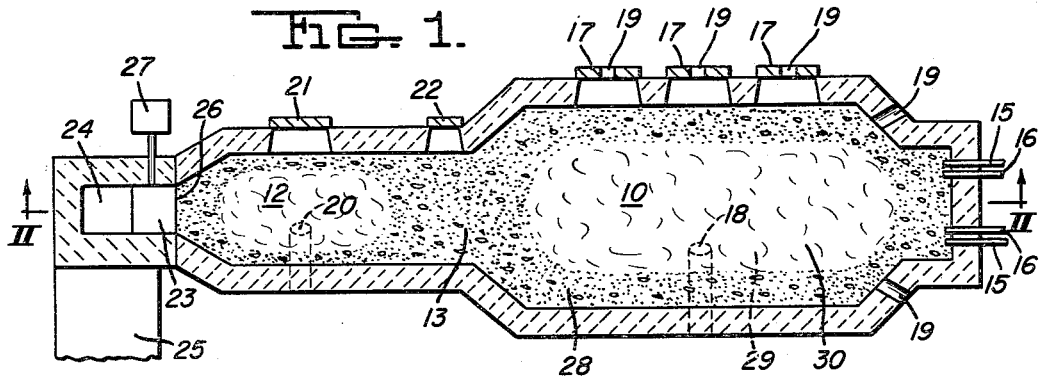
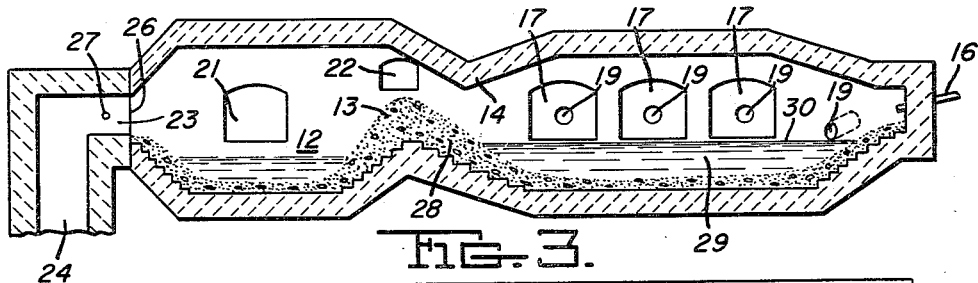
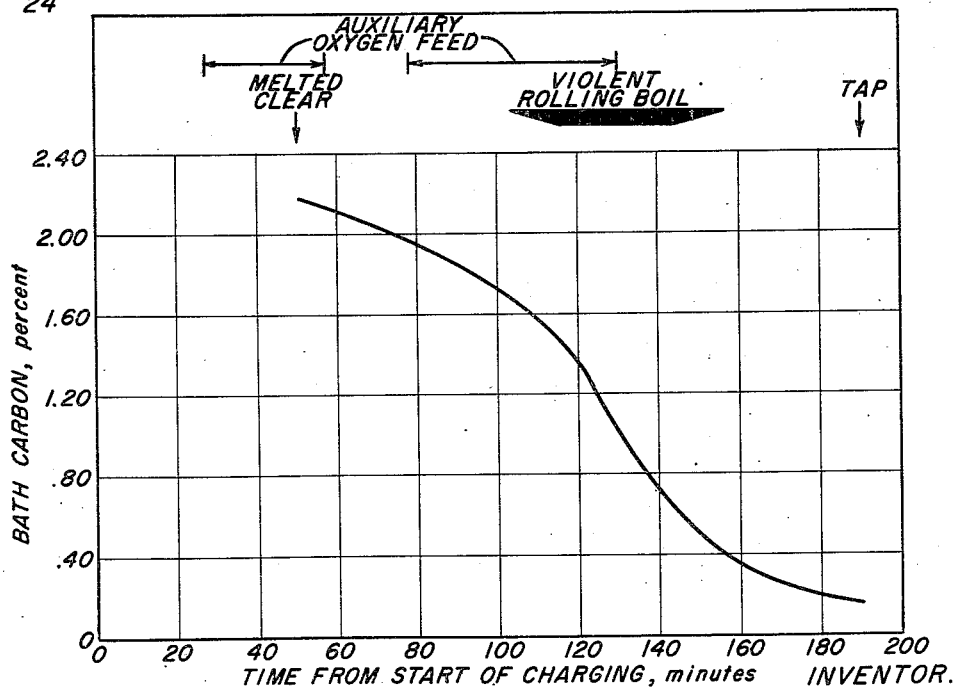
INVENTOR:
BERNARD M. LARSEN,
BY: Donald G. Dalton
his Attorney.

United States Patent Office 2,820,706
Patented Jan. 21, 1958

2,820,706

FURNACE AND METHOD FOR MAKING STEEL

Bernard M. Larsen, Fairhaven, N. J., assignor to United States Steel Corporation, a corporation of New Jersey Application July 26, 1955, Serial No. 524,416

8 Claims. (Cl. 75—52)

This invention relates to an improved open hearth type furnace and method of making steel.

Conventional open hearths have certain recognized disadvantages. For example, air utilized for combustion of fuel must be preheated, which necessitates extensive regenerative equipment where flue dust accumulates. Periodically this dust must be cleaned out, which is a costly and disagreeable task. Fuel consumption in an open hearth is unduly high (typically, a minimum of about 3 million B. t. u./ton of steel produced), and commonly at least eight or nine hours charge-to-tap time is required for each heat. Open hearths are not especially effective for eliminating sulphur from steel.

An object of my invention is to provide an improved open hearth type furnace structure and steel making method which overcome the foregoing disadvantages, but retain the ability of conventional open hearths to utilize wide varieties and combinations of raw materials.

A further object is to provide a steel making method which is peculiarly effective to eliminate such elements as sulphur and nitrogen, yet materially reduces both the fuel consumption and time required for each heat.

A further object is to provide a steel making method which utilizes a novel mechanism for transferring oxygen to a molten ferrous bath, namely absorption through a slag layer on the bath surface, this mechanism also establishing a controlled amount of extra oxygen immediately above the slag surface which insures complete oxidation of CO to $CO_2$ above the bath.

A further object is to provide an improved furnace structure which facilitates slag removal and largely eliminates the need for cleaning out flue dust.

In accomplishing these and other object of the invention, I have provided improved details of structure, a preferred form of which is shown in the accompanying drawings, in which:

Figure 1 is a diagrammatic horizontal section of an open hearth type furnace constructed in accordance with my invention;

Figure 2 is a longitudinal vertical section on line II—II of Figure 1; and

Figure 3 is a graph which illustrates the rate of carbon reduction in the charge in a typical steel making operation performed in accordance with my invention.

My open hearth is fired from only one end and is non-reversing. Structurally it includes a main melting chamber 10 and a slag collecting chamber 12 separated by a bank 13 and a knuckle 14 in the floor and roof respectively. Burners 15 and oxygen inlet pipes 16 communicate with ports in the end of the chamber 10 opposite the bank 13. One side of this chamber contains charging doors 17, and the opposite side has a tap-hole or spout 18. This chamber also has auxiliary oxygen ports 19 situated at the corners, in the charging doors or at other convenient locations. Preferably all the oxygen ports are spaced closely above the bath level of the chamber 10 and the inlet pipes are directed toward the bath at a low angle of incidence. The slag collecting chamber 12 has a slag tap-hole or spout 20 and a door 21 for fettling the slag pocket. The wall above the bank 13 has a door 22 for observation and repair of the bank. The end of the chamber 12 communicates through a port 23 with a downcomer 24, which leads to a waste heat boiler 25. Preferably the furnace is tiltable to pour molten metal and slag from the chambers 10 and 12, and the end of the walls of the chamber 12 slidably abut those of the port 23 in a plane 26 to permit relative movement. A sampling means and oxygen recorder 27 of conventional construction (for example A. O. Beckman Oxygen Analyzer Model F–3, manufactured by Beckman Instruments, Inc., South Pasadena, California) are connected to the port 23 to furnish an indication of the free oxygen content of gases leaving the chamber 12. The furnace bottom is surfaced with usual basic bottom materials 28, such as magnesite or double burned dolomite, and its slopes lie at normal angles of repose for these materials. The height of the bank 13 and the slopes of the roof of the chamber 12 and knuckle 14 minimize direct radiation from the chamber 10 from reaching the downcomer 24 and the boiler 25.

According to my steel making method, an open hearth constructed as just described receives a charge similar to a conventional open hearth charge, except that no ore or scale is included. Preferably the ultimate charge consists of about 60 to 25 percent scrap and 40 to 75 percent hot metal, plus the usual limestone or burnt lime flux in an amount equivalent to about 60 to 80 pounds of burnt lime per ton of steel. The flux and scrap are charged first and the latter is melted down by burning liquid or gaseous fuel in the burners 15 with commercially pure oxygen introduced through the ports 16. Neither the fuel nor the oxygen is preheated, whereby no regenerators are needed. During the early period of heating up the cold scrap, the auxiliary oxygen ports 19 are not used, and the excess oxygen is sufficient only to maintain about 1 percent free oxygen in the gases leaving the port 23.

After the scrap attains in part a minimum temperature of about 2500° F., wüstite (ferrous oxide) forms its surface and becomes liquid. Thereafter the bath absorbs oxygen more rapidly, and additional oxygen is introduced through some of the auxiliary ports 19. The oxygen absorbed in this period should be sufficient to oxidize all the silicon and part of the manganese in the hot metal charged later. Consequently stored-up oxygen largely eliminates any subsequent "dead bath" period. During this absorption stage the gases leaving the port 23 should contain about 2 to 5 percent free oxygen. Essentially all the oxygen absorbed is used to burn iron with such a large heat evolution that the rate of scrap melting is accelerated materially. The auxiliary oxygen supply insures an oxygen pressure at much of the melting scrap-gas interface sufficiently high so that sulphur passes into the gas phase as $SO_2$. High-sulphur scrap may thus be used, since up to ½ to ⅔ of its sulphur content is eliminated. As soon as the scrap is "melted flat" or when enough oxygen has been absorbed for silicon elimination from the subsequent hot metal addition, auxiliary oxygen introduction is temporarily reduced or discontinued.

Somewhat before the scrap is completely melted, hot metal is added to the charge. At the conclusion of the melt-down, the charge forms a bath 29, which carries a slag layer 30. Silicon and manganese of course commence to oxidize immediately after addition of the hot metal, and a carbon boil also commences very quickly. The rate of auxiliary oxygen introduction again is increased to furnish more oxygen for absorption into the slag and metal of the bath and to burn carbon monoxide evolved in the carbon boil. At this stage a supply of oxygen is needed immediately above much of the area of the slag surface. An important feature of my invention is that the angle and force of the oxygen jets are regulated not to penetrate the slag layer 30 mechanically. Instead this layer is maintained substantially intact except for gas escaping the bath. The slag surface carries a continuous gas film of a thickness of 0.01 to 1 mm. I maintain a steep oxygen pressure gradient through this film. Consequently the slag absorbs oxygen and transfers it to the metal of the bath by diffusion plus the stirring effect of the carbon boil. The combustion of carbon monoxide furnishes considerable heat and enables the fuel input to be cut back or eliminated. This procedure produces a carbon drop in the bath of about 150 to 250 points (1.50 to 2.50 percent) per hour. This same steep oxygen gradient at the slag-gas interface causes sulphur elimination as $SO_2$ from the slag just as it does from the melting scrap, as noted above. Overall sulphur elimination thus varies from about 0.008% (of metallic charge) in heats with low-sulphur charges, to around 0.035% in heats with high-sulphur charges. This gives a product much lower in sulphur and the effect here is also further evidence of the novelty of this refining technique.

When the carbon reaches a level about 10 to 20 points above that desired at tap, the rate of carbon drop is retarded. This is accomplished by reducing the auxiliary oxygen and by raising its jet stream so that it does not impinge directly on the slag surface, and thus reduce oxygen absorption into the bath, while yet maintaining a small excess of free oxygen in the gases at the port 23. In this last stage the iron oxide in the slag layer 30 diminishes, and some reversion of both manganese and iron from slag to metal occurs, and there is time for sampling or final slag additions. Sometimes it becomes necessary to discontinue all fuel and cool the bath in this final period.

Figure 3 illustrates graphically the progress of a typical steel making operation in a furnace constructed as shown in Figures 1 and 2 and operated according to my method. The charge was 40 percent scrap and 60 percent blast furnace basic iron, plus the usual limestone flux. Auxiliary oxygen was introduced over about 30 minutes of the melt-down period, beginning about 25 minutes after the start of charge. The charge melted clear at about 2.10% carbon in about 50 to 60 minutes from the start of charging (due to a hot furnace at the start plus the heat effect of the nearly pure oxygen feed). Auxiliary oxygen spray over the slag was started about 1 hour and 20 minutes after the start of charging, after the carbon level at the conclusion of the melt-down had been determined, and was continued for about 50 minutes or until the bulk of the carbon was removed (2.18% C to 1.00% C). The carbon boil started slowly but soon built up to a speed of over 150 points per hour. After the auxiliary oxygen feed was cut to a low rate, iron oxide stored in the slag maintained a rapid carbon drop to around 0.50% C; the carbon drop rate then decreased toward tap time which was 3 hours and 10 minutes after charging. The metal bath at tap analyzed:

| | Percent |
|---|---|
| C | 0.16 |
| Mn | 0.17 |
| P | 0.033 |
| S | 0.011 |
| Fe | balance |

This analysis is normal for an open hearth steel except for the exceptionally low sulphur. Tap slag contained 21.6% iron.

While I have shown and described only a single embodiment of my invention, it is apparent that modifications may arise. Therefore, I do not wish to be limited to the disclosure set forth but only by the scope of the appended claims.

I claim:

1. A method of making steel comprising melting down iron scrap and a flux of the group consisting of limestone, burnt lime and mixtures thereof and adding hot metal thereto to form a bath of molten ferrous metal which carries a layer of molten slag, applying commercially pure oxygen gas over said slag layer under a pressure insufficient to penetrate this layer mechanically, and transferring oxygen to the metal of said bath exclusively by absorption and diffusion plus convection through said slag layer.

2. A method as defined in claim 1 wherein the bath is derived from about 60 to 25 percent iron scrap and about 40 to 75 percent hot metal plus flux in an amount equivalent to about 60 to 80 pounds burnt lime per ton of steel produced.

3. A method of making steel comprising melting down a charge of iron scrap and a flux of the group consisting of limestone, burnt lime and mixtures thereof, oxidizing a portion of the iron in the scrap, adding hot metal to said charge to form a bath of molten ferrous metal which carries a layer of molten slag, the iron of the scrap being sufficiently oxidized to furnish oxygen for removal of the manganese and silicon in the hot metal, applying commercially pure oxygen gas over said slag layer under a pressure insufficient to penetrate this layer mechanically, and transferring oxygen to the metal of said bath for removal of carbon exclusively by absorption and diffusion plus convection through said slag layer.

4. A method as defined in claim 3 wherein the ultimate charge consists of about 60 to 25 percent iron scrap and about 40 to 75 percent hot metal plus flux in an amount equivalent to about 60 to 80 pounds burnt lime per ton of steel produced.

5. A method of making steel comprising melting down a charge of iron scrap and a flux of the group consisting of limestone, burnt lime and mixtures thereof by burning fuel with commercially pure oxygen, adding auxiliary oxygen to oxidize a portion of the iron in the scrap, adding hot metal to said charge to form a bath of molten ferrous metal which carries a layer of molten slag, the iron of the scrap being sufficiently oxidized to furnish oxygen for removal of the manganese and silicon in the hot metal and starting a carbon boil in the bath promptly after the hot metal is added, applying commercially pure oxygen gas over said slag layer under a pressure insufficient to penetrate this layer mechanically, and transferring oxygen to the metal of said bath for removal of carbon exclusively by absorption and diffusion plus convection through said slag layer.

6. A method as defined in claim 5 wherein the ultimate charge consists of about 60 to 25 percent iron scrap and about 40 to 75 percent hot metal plus flux in an amount equivalent to about 60 to 80 pounds burnt lime per ton of steel produced.

7. A method of making steel in an open hearth furnace comprising melting down a charge of iron scrap and a flux of the group consisting of limestone, burnt lime and mixtures thereof by burning fuel introduced from one end only of the furnace with commercialy pure oxygen, adding auxiliary oxygen to the furnace to oxidize a portion of the iron in the scrap, adding hot metal to said charge to produce a bath of molten ferrous metal which carries a layer of molten slag, the ultimate charge consisting of about 60 to 25 percent scrap and about 40 to 75 percent hot metal plus flux in an amount equivalent to about 60 to 80 pounds burnt lime per ton of steel produced, the iron of the scrap being sufficiently oxidized to furnish oxygen for removal of the manganese and silicon in the hot metal, applying commercially pure oxygen gas over said slag layer under a pressure insufficient to penetrate this layer mechanically, and transferring oxygen to the metal of said bath for removal of carbon exclusively by absorption and diffusion plus convection through said slag layer.

8. A method as defined in claim 7 wherein sulphur is eliminated as gaseous $SO_2$ from the metal and slag.

References Cited in the file of this patent

UNITED STATES PATENTS

| | | |
|---|---|---|
| 1,032,653 | Brassert | July 16, 1912 |
| 1,907,782 | Gaines | May 9, 1933 |
| 1,995,524 | Russ | Mar. 26, 1935 |
| 2,093,666 | Vogt | Sept. 21, 1937 |
| 2,523,475 | McQuaid | Sept. 26, 1950 |
| 2,598,393 | Kalling et al. | May 27, 1952 |
| 2,603,476 | Whiston | July 15, 1952 |
| 2,668,759 | Tanenbaum | Feb. 9, 1954 |

OTHER REFERENCES

Camp and Francis: The Making, Shaping, and Treating of Steel, six edition, pp. 433–442; published by United States Steel Company, Pittsburgh, Pennsylvania.